Oct. 2, 1928.
G. A. DE VLIEG
1,686,268
TABLE CONTROL MECHANISM
Filed Oct. 22, 1926
5 Sheets-Sheet 5
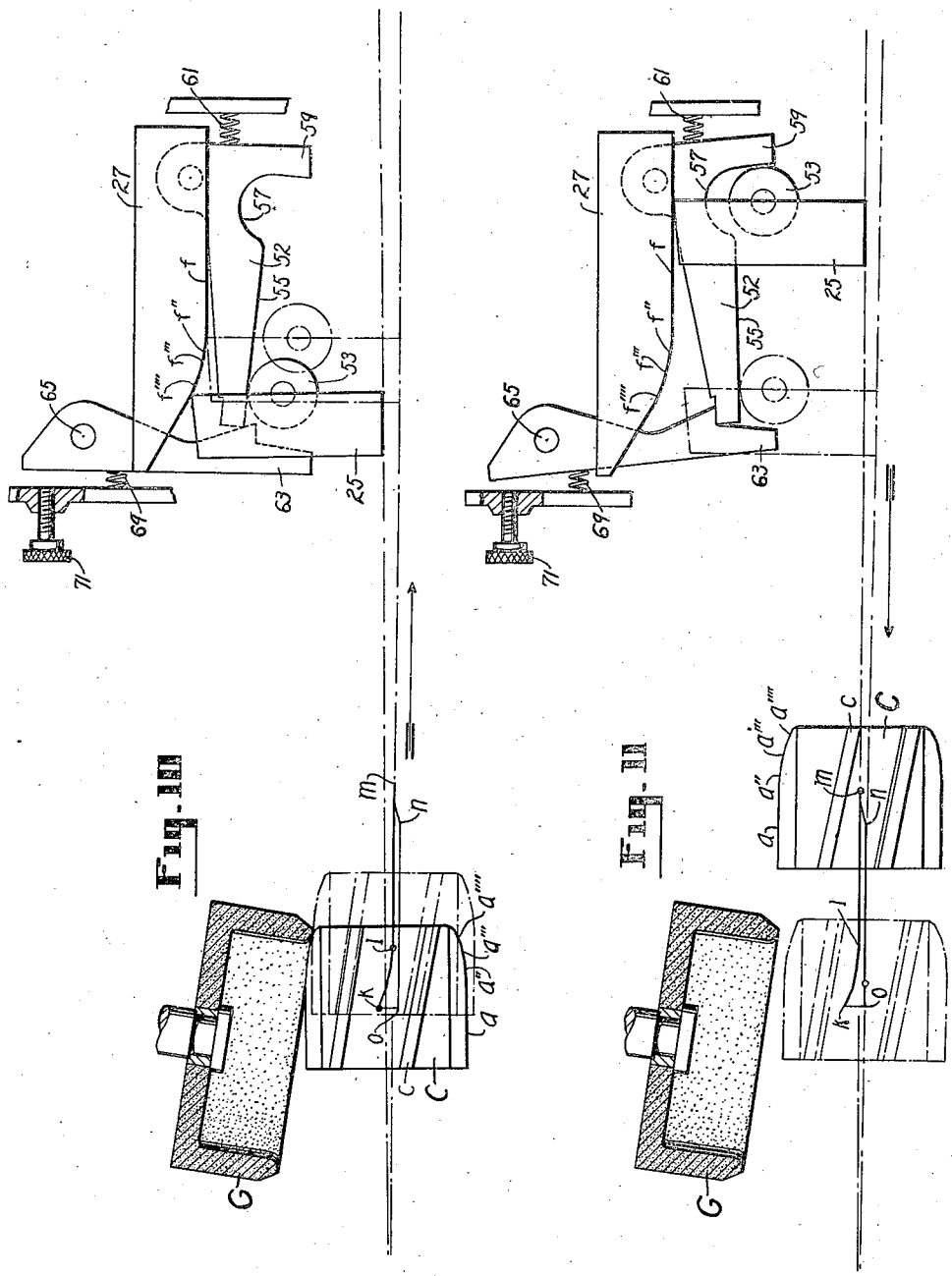
INVENTOR
*Gerard A. DeVlieg*
BY
*Churchill Parke Carlson*
ATTORNEYS Patented Oct. 2, 1928.

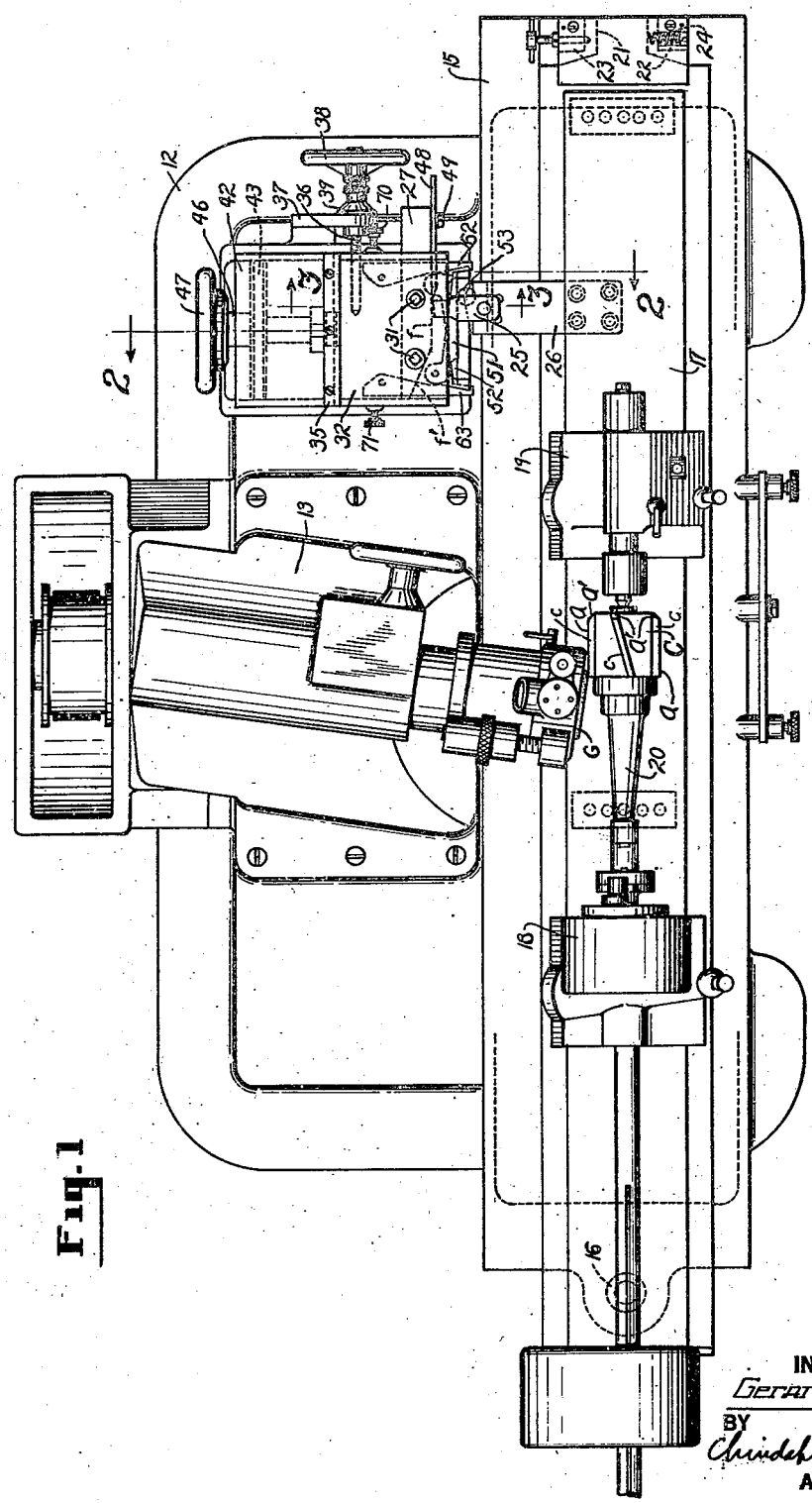

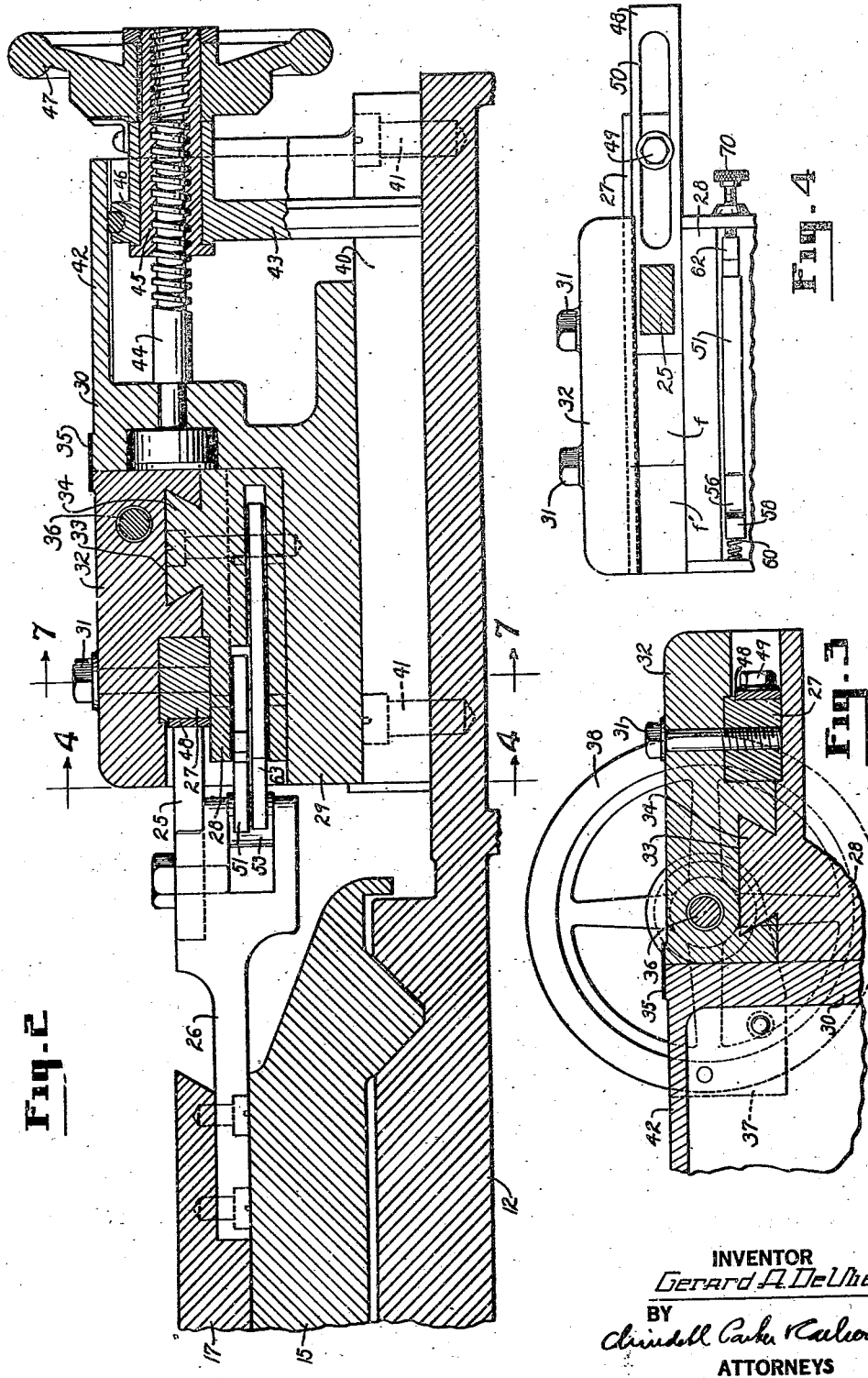

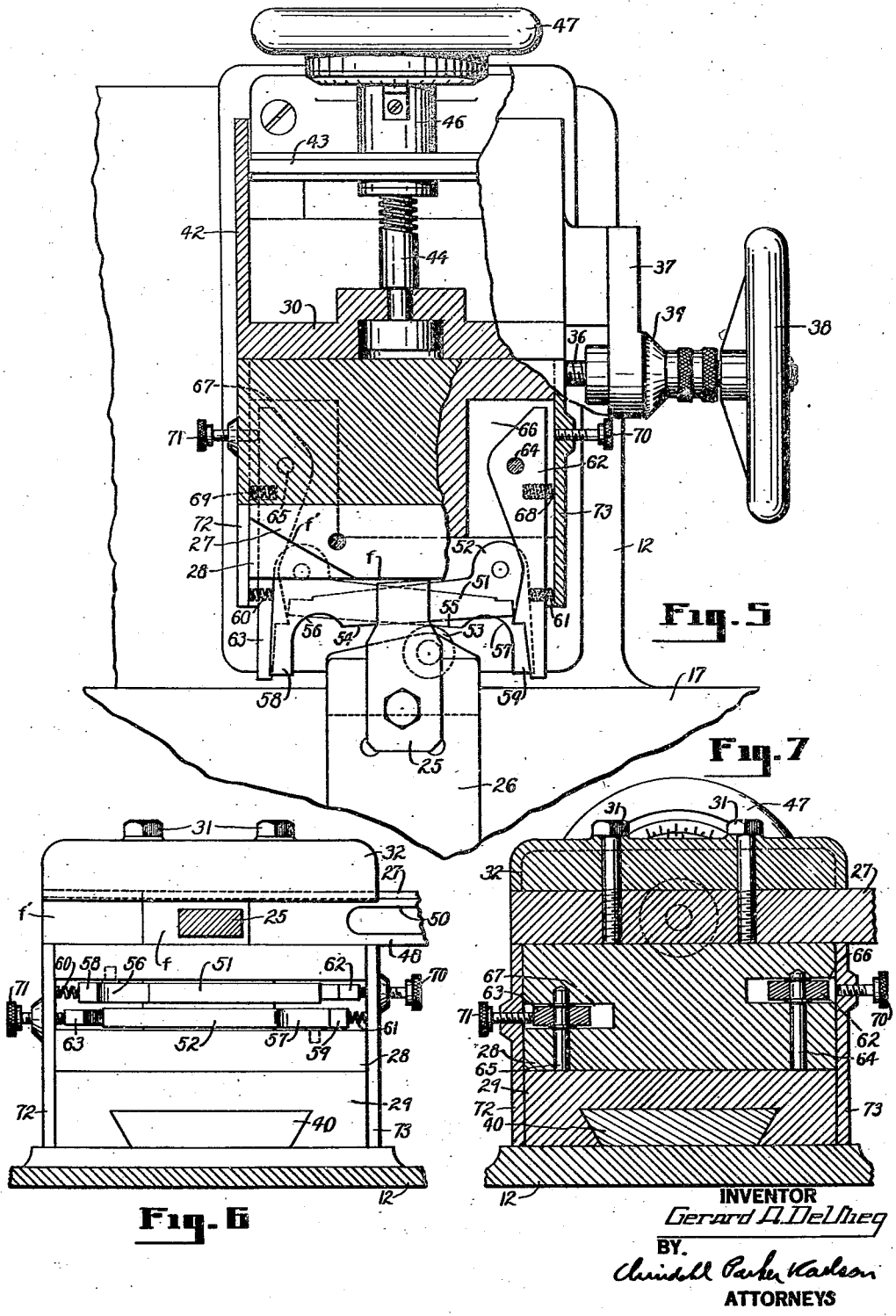

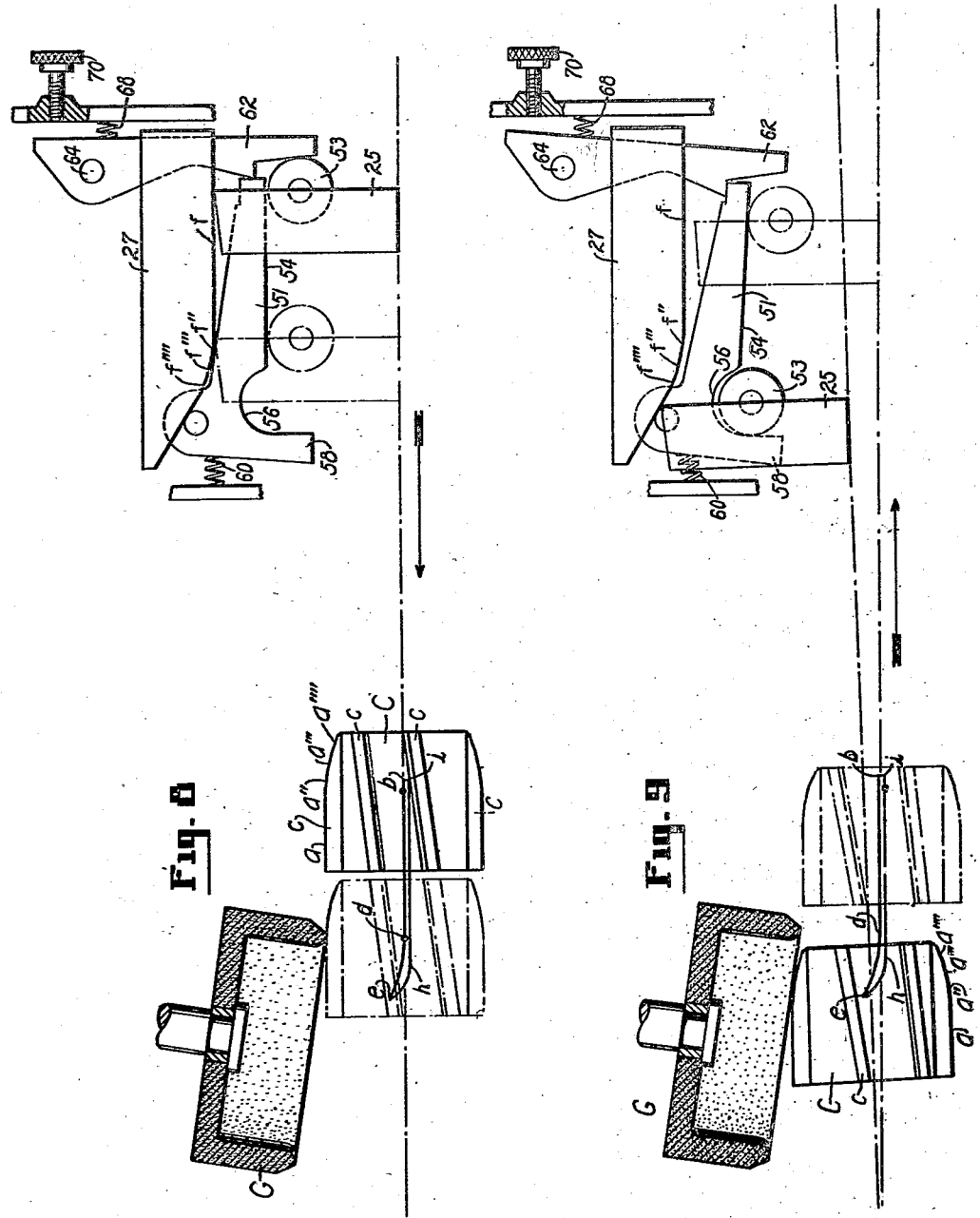

1,686,268

UNITED STATES PATENT OFFICE.

GERARD A. DE VLIEG, OF ROCKFORD, ILLINOIS.

TABLE-CONTROL MECHANISM.

Original application filed December 17, 1924, Serial No. 756,418. Divided and this application filed October 22, 1926. Serial No. 143,344.

The present invention relates to improvements in table control mechanisms for machine tools, and has particular reference to a new and improved mechanism for causing a table to move through a succession of closed cycles.

The present invention is particularly applicable to grinding machines or milling machines in which the cutting element and the work are moved relatively in alternately cutting and free return strokes. On the cutting stroke, the work is presented to the cutting element, and a cam controls the configuration of the cut. On the return stroke, the cutting element and the work are separated.

The primary object of the present invention is to provide new and improved means for automatically controlling the movement of the table, supporting either the work or the cutting element, to cause said table to move through a closed cycle.

More specific objects are to provide a novel table control mechanism in which the controlling cam may be adjusted or replaced by other cams of different shapes to vary the configuration of the cut on the work, which will be tripped automatically at the end of each stroke to move the work or the cutting element, as the case may be, from that stroke into the other stroke, which is adapted for machining work parts of a wide range of sizes, and which can be easily and quickly adjusted to reverse the cycle to cut either right or left hand work blanks.

Another object of the invention is to provide a table control mechanism of the above character which is simple and inexpensive in construction, and which is extremely accurate and certain in operation.

Further objects and advantages will become apparent as the description proceeds.

In the accompanying drawings:

Figure 1 is a plan view of a grinding machine in which a mechanism embodying the features of my invention has been incorporated.

Fig. 2 is a vertical section of the mechanism taken substantially along line 2—2 of Fig. 1.

Fig. 3 is a fragmentary vertical section taken along line 3—3 of Fig. 1.

Fig. 4 is a fragmentary section taken along line 4—4 of Fig. 2.

Fig. 5 is a fragmentary view showing various partial horizontal sections of the table control mechanism.

Fig. 6 is a complete vertical section taken along line 4—4 of Fig. 2.

Fig. 7 is a vertical section taken along line 7—7 of Fig. 2.

Figs. 8 and 9 are diagrammatic views illustrating the cyclic movement of the work under the control of the mechanism, the cycle being adapted for a left hand rotary cutter.

Figs. 10 and 11 are views corresponding respectively to Figs. 8 and 9 for a right hand rotary cutter.

While the invention is susceptible of various modifications and alternative constructions, I have shown in the drawings and will herein describe in detail the preferred embodiment, but it is to be understood that I do not thereby intend to limit the invention to the specific form disclosed, but intend on the contrary to cover all modifications and alternative constructions falling within the spirit and scope of the invention as expressed in the appended claims.

In the accompanying drawings, I have shown the preferred embodiment of my invention applied to a grinding machine for sharpening rotary cutters, such as reamers, and in general cutters having a plurality of spaced blades or elements. It is to be understood, however, that the invention may be applied to various other types of machines for operating on different kinds of work or for performing different operations on the same kind of work.

The grinding machine illustrated in Fig. 1 of the accompanying drawings comprises generally a base 12, on the rear of which is mounted a vertical standard 13 supporting a grinding wheel G for rotation. A sub-base 15 is mounted for reciprocation on the front of the base 12. The axis of the grinding wheel G is slightly inclined from a perpendicular to the sub-base 15 to provide suitable clearance. Pivotally mounted at one end on a stud 16 on the sub-base 15 is a table 17 which adjustably supports a headstock 18 and a tailstock 19. A work arbor 20 for a cutter C is rotatably supported between the centers of the headstock 18 and tailstock 19. The cutter C, in the present instance, is provided with a plurality of uniformly spaced inclined blades c. Each blade is formed with a crown a falling within a cylindrical surface, and with a single nose angle a' or a plurality of adjoining and differently inclined nose angles a'', a''' and a'''' tapering from such surface. The cutter C is adapted to be rotated continuously in one direction in synchronous relation to the reciprocation of the sub-base 15 and the inclination and spacing of the blades c. The means for rotating the grinding wheel G, reciprocating the sub-base 15, and rotating the cutter C are fully disclosed in my copending application, Serial No. 756,418, filed December 17, 1924, of which this application is a division.

The table control mechanism which exemplifies my invention is adapted to control the position of the table 17 to cause the cutter C to move in a straight line while the crown of each blade is being cut, then to move laterally toward the grinding wheel while the end bevel is being cut, and then to separate from the grinding wheel and return in a free stroke to its initial position.

The free end of the table 17 is formed with a reduced portion 21 which is movably disposed between two spaced blocks 22 and 23 on the right end of the sub-base 15. A spring 24 mounted in the block 22 engages the extension 21 and tends to pivot the table 17 rearwardly to move the cutter C toward the grinding wheel G. Pivotal movement of the table 17 under the influence of the spring 24 is controlled through a cam arm 25 which is mounted on a bracket 26 secured to the free end of the table and extending laterally and rearwardly therefrom. The cam arm 25 on the cutting stroke is adapted to ride along a fixed cam 27 which is shaped to produce the desired configuration on the work blank. In the present instance, the face of the cam 27 has a main portion f which is straight and parallel to the sub-base 15 and defines the line of grinding contact for the crown a of each blade c, and has a rearwardly inclined portion on its left end which defines the line of grinding contact for the nose of each blade. When the blades c have single nose angles a', the cam face is formed with a single end bevel f' (see Figs. 1, 4, 5 and 6). When the blades c have a plurality of nose angles a'', a''', and a'''', the cam face comprises a plurality of adjoining and differently inclined end bevels f'', f''', and f'''' (see Figs. 8 to 11).

The cam 27 is positioned for longitudinal adjustment on the front end of a block 28 rigidly secured to the forwardly extending shelf 29 of a suitably housing or frame 30, and is removably secured by means of bolts 31 to the under side of a slide 32 resting on the block. To permit longitudinal adjustment of the cam 27, the slide 32 is formed with a guideway 33 engaging a dovetailed guide 34 on the block 28. A guard plate 35 on the frame 30 projects over the rear edge of the slide 32 to prevent entry of foreign matter between the bearing surfaces. An adjusting screw 36, which is rotatably mounted in a side bracket 37 on the side of the frame 30, has threaded engagement with the slide 32, and is provided with a suitable hand wheel 38 by means of which desired adjustments can be effected. The screw 36 is provided with a micrometer dial 39 which indicates the position of adjustment of the cam 27 longitudinally of the sub-base 15.

The housing 30 is adjustably mounted on a dovetailed guide 40 extending laterally of the base 12, and rigidly secured thereto by bolts 41. Formed integral with the frame 30 is a rearwardly extending shell 42 which fits slidably over the edges of a bracket 43 on the rear end of the guide 40. A non-rotatable screw 44 is rigidly anchored at one end to the frame 30, and extends rearwardly into threaded engagement with a sleeve nut 45 rotatably mounted in a bearing 46 in the bracket 43. The nut is provided with a hand wheel 47 for adjusting the frame 30 and hence the cam 27 toward and from the sub-base 15.

The cam 27 serves to control the movement of the cutter C past the grinding wheel in the cutting stroke. In certain instances where extremely short cutters are to be sharpened having collars larger in diameter than the cutter, or having other parts which might be engaged by the grinding wheel, it is desirable to hold the cutter out of engagement with the grinding wheel G until the blades proper are in position to be ground. For this purpose a cam plate 48 is adjustably secured over the straight end of the face of the cam 27, as by means of a bolt 49 extending through a longitudinal slot 50 in the plate into the cam. The inner end of the cam plate 48 is beveled to permit the cam arm 25 to move therefrom onto the cam 27 without a sudden jar or bang.

Means is provided for automatically separating the cutter C and the grinding wheel G at the end of the cutting stroke, holding the cutter out of engagement with the grinding wheel during the return stroke, and automatically permitting a return of the cutter to initial position in the next cutting stroke at the completion of the return stroke. This means, in the present instance, comprises a left hand cam 51 and a right hand cam 52 which are pivotally mounted respectively in the left and right hand sides of the block 28, and the free ends of which extend in opposite directions substantially parallel to and ahead of the cam 27. These cams are adapted selectively to coact with a cam roller 53 carried by the bracket 26, to oscillate and hold the cutter C away from the grinding wheel G during the return stroke.

The cams 51 and 52 respectively have straight cam faces 54 and 55 which terminate near the pivots in circular recesses 56 and 57. These recesses are partially defined by forwardly extending arms 58 and 59 respectively on the pivoted ends of the two cams. Coil springs 60 and 61 interposed between opposite side plates 72 and 73 of the casing 30 and the arms 58 and 59, respectively, tend to move the cams rearwardly away from the roller 53 on the table 17. The cams 51 and 52 are adapted to be held selectively in operative position, in which either coacts with the roller 53 to hold the cutter C out of engagement with the grinding wheel G, by pawls 62 and 63 respectively, adapted to engage the free ends of the cams as the latter are moved forwardly through engagement of the roller 53 with the arms 58 and 59.

The pawls 62 and 63, respectively, are pivotally mounted at their rear ends on pins 64 and 65 in slots 66 and 67 in opposite sides of the block 28, and are pressed yieldingly into engagement with the free ends of the cams 51 and 52 by coil springs 68 and 69 interposed between the side plates 72 and 73 of the casing and said pawls. A pair of screws 70 and 71 extend through the opposite side plates of the frame, and are adapted to be adjusted into engagement with the heels of the pawls to hold the latter inoperative, that is, away from the ends of the cams 51 and 52. In operation, only one of the pawls is used at one time. If a left hand cutter is to be sharpened, the right hand pawl 63 is held inoperative by adjusting the screw 71. If a right hand cutter is to be sharpened, the pawl 62 is held inoperative by adjusting the screw 70.

The cycle of movement for a left hand cutter is fully disclosed in Figs. 8 and 9. Fig. 8 shows the initial position of the cutter C. As the table 17 is moved to the left, the cam arm 25 moves along the straight portion f of the cam 27, and the cutter C consequently moves along a straight line b—d across the forward edge of the grinding wheel G to grind the crown of the blade. The cutter C is rotated in timed relation to this movement to bring successive points along the inclined cutting edge of the blade into engagement with the grinding wheel in a fixed horizontal plane. Upon further movement of the table to the left, the cam arm 25 rides over the bevels f'', f''' and f'''' of the cam 27, and thereby permits the table to be oscillated successively through varying degrees determined by the inclinations of said bevels. The cutter C is thereby moved along the broken line d—e to grind the nose angles a'', a''' and a'''' of the blade. As the table moves into its extreme left position (see Fig. 9) the roller 53 engages the arm 58 to move the cam 51 forwardly. The pawl 62 then immediately locks the cam 51 in position.

At the start of movement of the table 17 to the right, the roller 53 leaves the recess 56 of the cam 51 and thereby oscillates the table forwardly beyond its central position to move the cutter along bent line e—h away from the grinding wheel. Upon further movement, the roller 53 rides along the cam 51 to hold the cutter C out of engagement with the grinding wheel G during the return stroke along line h—i. When the table moves into its extreme right position the roller 53 trips the pawl 62 to release the cam 51 thereby permitting a return of all parts to their initial positions.

In grinding a right hand cutter the operation is similar. In this instance, the cam 52 is rendered operative and the cam 51 is rendered inoperative. Movement of the table to the right, results in movement of the cutter C, first along bent line k—l to bevel the end of the blade and then along line l—m to grind the crown. At the completion of the cutting stroke, the cam 52 is moved into and held in operative position so that in the return stroke the cutter moves first along line m—n and then along line n—o. Upon disengagement of the pawl 63 with the cam 52, the cutter moves along line o—k to its initial position.

It will be evident that I have provided a novel and advantageous control means for tables which is adjustable to provide numerous movements, adapted for different work blanks. By rendering both of the movable cams inoperative, the table can be reciprocated along a fixed line of movement, that is, the free return stroke can be omitted. The construction is simple, inexpensive and sturdy, and operation is certain and exact.

I claim as my invention:

1. A control mechanism having, in combination with a support mounted for reciprocatory and pivotal movement, a cam for controlling the movement of said support during reciprocation in one direction, a second cam adapted to be moved into operative position at the end of said reciprocation to hold said support out of engagement with said first mentioned cam and control the movement of said support during reciprocation in the other direction, and means for holding said second cam in operative position, said support being adapted to release said means at the end of said last mentioned reciprocation.

2. A control mechanism having, in combination with a support mounted for reciprocatory and pivotal movement, a cam adapted to coact with said support to control the pivotal position thereof during reciprocation in one direction, a second cam adapted to be moved into operative position at the end of said reciprocation and adapted to hold said support away from said first mentioned cam during reciprocation in the other direction, and means for holding said second cam in operative position during said last mentioned reciprocation.

3. A control mechanism having, in combination with a reciprocatory support and a table movably mounted on said support, a cam pivotally mounted at one end, said cam having a trip arm on its pivoted end, means reciprocable with said support adapted to engage said arm to move said cam into operative position, spring means tending to move said cam out of operative position, and a spring pressed pawl adapted to hold said cam in operative position, said first mentioned means being adapted to coact with said cam to control the position of said table on said support and being adapted at one end of the reciprocation to trip said spring pressed pawl to release said cam.

4. A control mechanism for a reciprocatory support movable substantially laterally of the direction of reciprocation having, in combination, a fixed cam, a cam arm on said support adapted to engage said fixed cam, a pivotal cam adapted to hold said arm out of engagement with said first-mentioned cam, means for moving said pivotal cam into operative position, and trip means for holding said pivotal cam in operative position.

5. A control mechanism having, in combination with a reciprocatory support and a table movably mounted on said support, a pivotal cam having a trip arm on its pivoted end, a spring pressed pawl adapted to engage the other end of said cam to hold the latter in operative position, and means on said table adapted to engage said arm to move said cam into operative position, to coact with said cam to control the position of said table on said support, and to engage said pawl to release said cam to inoperative position.

6. A control mechanism for a reciprocatory support movable substantially laterally of the direction of reciprocation having, in combination, a fixed cam, a cam arm on said support adapted to engage said fixed cam, a pair of pivotal cams adapted respectively to hold said arm away from said fixed cam during reciprocations in opposite directions, and means for selectively rendering said pivotal cams operative.

7. A control mechanism having, in combination with a reciprocatory support, a table movably mounted on said support, and spring means tending to move said table in one direction on said support, a fixed cam, an arm on said table adapted to coact with said cam to control the position of said table on said support, and means for separating said arm and said cam against the force of said spring during a predetermined extent of each complete reciprocation on said support.

8. A control mechanism having, in combination with a reciprocable carriage and a table movably mounted on said carriage, a stationary cam for controlling the movement of said table in one direction of reciprocation, a movable cam for controlling the movement of said table in the other direction of reciprocation, and trip means for moving said movable cam into operative position at a predetermined point in the reciprocation, holding said movable cam in operative position, and releasing said movable cam at a second predetermined point in the reciprocation.

9. A control mechanism having, in combination with a reciprocatory support, a table pivotally mounted on said support, a fixed cam having a predetermined contour, means for adjusting said cam laterally and longitudinally, spring means tending to pivot said table toward said cam, an arm on said table adapted to coact with said cam throughout a portion of the reciprocation, and a movable cam adapted to be positioned ahead of said fixed cam to separate the latter and said arm, said movable cam being adapted to control the position of said table throughout the remaining portion of the reciprocation.

10. A control mechanism having, in combination with a support mounted for pivotal and reciprocatory movement, a cam having a predetermined contour for controlling the pivotal movement of said support in relation to the reciprocatory movement, means on said support for coacting with said cam, and a cam plate adjustably mounted on one end of said cam for holding said support away from said cam during a portion of the reciprocatory movement.

In testimony whereof, I have hereunto affixed my signature.

GERARD A. De VLIEG.